United States Patent [19]

Stenzel et al.

[11] Patent Number: 5,648,620
[45] Date of Patent: Jul. 15, 1997

[54] SLIDING SURFACE BEARING

[75] Inventors: Otto W. Stenzel, Neuhütten; Georg Sick, Felderfing; Eduard Köhler, Neckarsulm; Herbert Möding, Friedrichshall; Jürgen Niehues, Oedheim, all of Germany

[73] Assignee: KS Aluminium-Technologie Aktiengesellschaft, Neckarsulm, Germany

[21] Appl. No.: 393,745

[22] Filed: Feb. 24, 1995

[30] Foreign Application Priority Data

Feb. 25, 1994 [DE] Germany .......................... 44 06 191.9

[51] Int. Cl.$^6$ .......................... F02F 1/00; F02F 1/24
[52] U.S. Cl. .......................... 75/232; 75/236; 75/246; 75/249; 123/193.5
[58] Field of Search .......................... 75/232, 236, 246, 75/249; 123/193.5

[56] References Cited

U.S. PATENT DOCUMENTS

| | | | |
|---|---|---|---|
| 4,936,270 | 6/1990 | Ushio et al. | 75/232 |
| 5,315,970 | 5/1994 | Rao et al. | 123/193.2 |
| 5,320,909 | 6/1994 | Scharman et al. | 428/472 |
| 5,323,838 | 6/1994 | Hamashima et al. | 164/113 |
| 5,358,753 | 10/1994 | Rao et al. | 427/451 |
| 5,466,906 | 11/1995 | McCune, Jr. et al. | 219/121.47 |
| 5,503,122 | 4/1996 | Ritland et al. | 123/188.3 |
| 5,507,258 | 4/1996 | Sasaki | 123/193.6 |
| 5,529,620 | 6/1996 | Corbett et al. | 106/272 |
| 5,549,086 | 8/1996 | Ozawa et al. | 123/193.6 |

FOREIGN PATENT DOCUMENTS

| | | |
|---|---|---|
| 0449356 | 10/1991 | European Pat. Off. |
| 2252797 | 5/1973 | Germany. |
| 9112350 | 8/1991 | WIPO. |
| 9117279 | 11/1991 | WIPO. |

*Primary Examiner*—Charles T. Jordan
*Assistant Examiner*—Daniel Jenkins
*Attorney, Agent, or Firm*—Sprung Horn Kramer & Woods

[57] ABSTRACT

A cast sliding surface bearing for guiding and supporting moving machine members consists of a light alloy matrix (4), which contains a cast-in shaped body (2), which constitutes portions of the sliding surface (6) and is made of a hard material and has open cavities, which contain infiltrated matrix material. In order to achieve improved tibological properties the open cavities of the shaped body are filled with matrix material, each of the hard portions of the shaped body which lie in the sliding surface has a size, measured in an axis, of ≦0.1 mm, and the distance between the hard portions of the shaped body, measured in an axis, is ≦2 mm.

19 Claims, 2 Drawing Sheets

SLIDING SURFACE BEARING

This invention relates to a cast sliding surface bearing for guiding and supporting rotating or radially or axially reciprocating machine members, which bearing consists of a light alloy matrix, which contains a cast-in shaped body, which constitutes portions of the sliding surface and is made of a hard material and has open cavities, which contain infiltrated matrix material.

From present-day aspects, light alloys are for the future the most important materials for use in vehicles and their use tends to increase. In addition to other advantages the saving of weight is utilized, which is achieved particularly in comparison with ferrous materials. This has appreciable results not only as regards the piston of internal combustion engines but very particularly also as regards cylinders. For instance a saving of weight by 40 to 60% can be or has already been achieved by the use of an aluminum alloy rather than grey cast iron to make a multi-cylinder block. In the periodical MTZ, Motortechnische Zeitschrift 35 (1974), on pages 33–41, a cylinder block has been described which has been made by low-pressure casting from a hypereutectic aluminum-silicon alloy of the type AlSi17Cu4Mg. Uniformly shaped silicon grains having a particle size between 30 and 80 micrometers have been formed in a uniform distribution in the sliding surface of the cylinder by primary precipitation. After the cylinder has been cast, the cylinder bore is machined by rough and finish boring and is subsequently subjected to coarse and finish honing so that the silicon grains are smoothened and are initially flush with the surrounding matrix of the aluminum alloy. After the honing, the aluminum alloy is removed between the silicon grains in a low depth by a chemical treatment so that the silicon grains, which constitute a structure for carrying the piston rings and the skirt of the position, protrude slightly, by 0.2 to 1.0 micrometer, from the unreinforced sliding surface of the cylinder. A cylinder having such a sliding surface can be used only in combination with a light alloy piston, which at least on its skirt is coated with an iron layer having a thickness of about 20 micrometers so that a contact between the aluminum alloy of the sliding surface of the cylinder and the light alloy of the piston will be avoided under all circumstances, even under extremely severe operating conditions. The presence of the ferrous coating considerably reduces the wear of the piston skirt and eliminates the risk of jamming between the piston skirt and the sliding surface of the cylinder. This cylinder design has the disadvantage that the entire cylinder is cast from a primary hypereutectic aluminum alloy which has been produced at high cost. The high silicon content results in a higher tool wear during the machining of the cylinder block.

It is also known to make linerless individual cylinders or multi-cylinder blocks from an aluminum alloy of the type AlSi9Cu3Mg. A base layer of nickel containing dispersed silicon carbide particles in a size of 1 to 3 micrometers has been electrodeposited in a thickness of 50 to 80 micrometers on the surface of the cylinder bore. The sliding surface of the cylinder is subsequently honed. The silicon carbide particles serve as a carrying structure for the piston rings and the piston skirt. The provision of the coating consisting of a nickel dispersion involves a considerable processing expenditure. Specifically, the electrodeposition plant must include means for decontaminating the processing baths. The sludge formed during the disposal must be collected and must be removed in accordance with regulations. The working regions of the coating baths must be provided with off-takes, which comprise built-in scrubbing systems. Further, in case of repairs it is expensive and complicated to regenerate the cylinder bores.

More recently, DE-A-37 25 495 has proposed for internal combustion engines a multi-cylinder block in which the sliding surface of the cylinder consists of fiber-rein-forced cylindrical portion consisting of 8 to 20% by volume of an alumina-based fiber and 0.3 to 15% by volume of carbon fiber in a light alloy matrix. The alumina-based fiber contains up to 25% silica. Together with a cylinder having such a sliding surface it is still necessary to use a light alloy piston which on its cylindrical outside surface is provided with a ferrous layer, which is covered by an also electrodeposited tin layer, so that contact between the light alloy matrix of the multi-cylinder block and the light alloy piston will be avoided. The hybrid fiber which has been infiltrated into the sliding surface of the cylinder is expensive. In addition, the tool wear is high and the machining involves a considerable expenditure because it can be effected only with cutting diamonds.

Because it is so desired so to design the individual cylinder or the multi-cylinder block that may consist of a hypoeutectic alloy which can be made at relatively low cost and preferably consists of a remelted aluminum alloy and tribological properties which are similar to those of hypereautectic aluminum alloys are present on the sliding surface of the cylinder, the periodical Aluminum 69, 1993, on pages 627/28, has disclosed a hollow-cylinderal shaped fibrous body which consists of short alumina fibers, is laden with silicon grains and contains a remelted aluminum alloy which has been infiltrated during the casting operation. The short alumina fibers do not constitute a part of the intended tribological system but serve only to ensure the spatial distribution of the silicon grains in the sliding surface of the cylinder. As the silicon grains exhibit a high solubility in aluminum, their reliable bonding to the aluminum alloy matrix is ensured. A disadvantage resides in that non-fibrous components of the shaped fibrous body, so-called "shots", may give rise to formation of cracks under alternating thermal stresses, stresses due to thermal shock, or other considerable loads. Further, the short alumina fibers result in a higher wear of the tools used to machine the sliding surface of the cylinder. Moreover, owing to the presence of the hard short alumina fibers it is difficult to realize the desired results unless the piston skirt and the piston rings are provided with an expensive reinforcement. In addition, the handling of the shaped fibrous bodies owing to their high fiber content requires expensive means for the protection of workers.

For these reasons it has been contemplated to avoid the use of a shaped body of short alumina fibers as a structure for carrying the silicon grain and to use highly porous silicon grains instead (periodical Aluminum 69, 1993, pages 627/28). For this reason it is an object of the invention to provide a shaped body which consists of hard material and has open cavities and, after it has been cast in, constitutes portions of the sliding surface of the sliding surface bearing and which in its open cavities contains infiltrated light alloy matrix and which has good tribological properties, i.e., very low friction and very low wear. Additionally, the shaped body desirably has high dimensional stability in order to ensure reliable manipulation as it is cast in. It is also desired to reduce the wear of the tools used to machine the sliding surface and the machining of the sliding surface should not cause parts of hard material to be broken out of the sliding surface. Moreover, the hard material which is used should have adequate emergency running properties and should be compatible with the contacting material so that the tendency to jam will be low. The term "shaped body" describes a body through which there extend innumerable cavities and passages communicating with one another.

This object is realized in accordance with the present invention pursuant to which open cavities of a shaped body, which is substantially free of closed cavities, are filled with matrix metal having a substantially low porosity, each hard portion of the matrix structure of the shaped body has a size, measured in an axis, of $\leq 0.1$ mm and the distance between those hard portions of the macrostructure of the shaped body which lie in the sliding surface, measured in an axis, $\leq 2$ mm.

The shaped bodies designed in accordance with the invention can much more effectively be infiltrated by the light alloy matrix so that the cavities can be filled with material having a low porosity, the portions of the shaped body are uniformly distributed in the sliding surface, and high wear resistance and good emergency running properties are achieved. Owing to the large surface area which is occupied by the portions of the shaped body lying in the sliding surface, that surface can effectively be machined with machining tools having relatively low wear. In a cast individual cylinder or multi-cylinder block that portion of the cavities into which the light alloy matrix has not penetrated is very small so that excessively large reserves of lubricant in the sliding surface of the cylinder are avoided. In other applications, such as sliding surface bearings, the proportion of the non-penetrated cavities is of lesser significance.

The hardness of the hard material of the shaped body is desirably at least 3 times the hardness of the light alloy matrix and, as the hardness of the hard material increases, the size of those portions of the shaped body which lie in the sliding surface decreases.

The hard material, which amounts to 5 to 50% by volume, consists of pure material, substantially of metals and metal alloys or intermetallic phases, such as silicon, titanium, vanadium, chromium, manganese, iron, cobalt, nickel, zirconium, molybdenum, $Al_3Zr$, $Al_3Cu$, $Al_3Ti$, $Al_xFe_yMn_z$, $Al_xCu_yNi_z$, $Mg_2Si$, etc., or of carbides, nitrides, borides, aluminides or silicides of all metals, particularly of the transition metals titanium, zirconium, hafnium, vanadium, niobium, tantalum, molybdenum or tungsten, preferably of tungsten carbide, titanium carbide, and tantalum carbide.

Non-metallic hard materials which may be used include boron carbide, silicon carbide, alumina and boron nitride, as well as ceramic oxides, particularly metal oxides, such as beryllium oxide, magnesia, calcium oxide, zirconium oxide, titanium oxide, chromium oxide, mullite, corderite, and spinal.

In the selection of the hard material the intended purpose must be taken into account and the hard material should have only minimum friction, i.e., minimum power dissipation, and only minimum wear, i.e., minimum removal of material, it should be effectively wettable by the melt formed by the light alloy matrix, and should have good adhesion to the light alloy matrix. Specifically, the hard material should form a bond with the light alloy matrix. If this is not possible it is desirable to bond the shaped body to the light alloy matrix by a primer layer.

A further feature of the invention resides in that the shaped body is composed of plurality of hard materials. In dependence on the desired tribological properties it is then possible to achieve emergency running properties in that relatively soft materials, such as graphite, lead, molybdenum sulfide, and relatively hard materials are combined.

It has been found that the dimensional stability of the shaped bodies can further be improved by mounting the shaped body on a thin-walled carrier which is made of sheet metal or a sieve or a woven mat or a nonwoven mat and which in dependence on its intended purpose may consist of a hollow cylinder, a curved sheet or the like.

For the infiltration of the aluminum alloy into the shaped body it is generally sufficient to apply pressures up to 25 bars and it is desirable to reduce the gas pressure in the casting mold below the atmospheric pressure before the infiltration. If it is desired to minimize the volume of gas pores in percent of the aluminum alloy matrix, the shaped body into which the aluminum alloy has been infiltrated should be subjected to a holding pressure which is at least 100 times higher than the gas pressure before the infiltration.

The shaped body has the required dimensional stability because its particles are interconnected by an inorganic binder, preferably an oxide or silicate binder, or by sintering.

The shaped bodies consist of particles consisting of spheres, grains, straight or curved platelets or straight or curved rods and said particles may be composed of one or more component materials. For instance, an aluminum alloy may contain precipitates of silicon, iron or $Al_3Zr$. The particles consisting of pure material components and particularly particles containing precipitates may be bonded by sintering, flame spraying or plasma spraying or by partly solidified molten droplets.

It has been found that where grains of silicon are employed it is particularly desirable to bond the grains to each other by means of silicon nitride that has been formed at their boundaries.

If the shaped bodies are composed of silicon grains, they are desirably bonded by means of chemically precipitated silicon.

The shaped body may alternatively be made of bulk material. The required dimensional stability is imparted to the shaped body by an apertured sheath, which is non-positively or positively joined and consists, e.g., of a sieve, a perforated metal sheet, or the like. The apertures may be closed by a plastic film, which can be described by the melt formed by the light alloy matrix.

The invention is illustrated by way of example in the drawings wherein.

Figure 1:
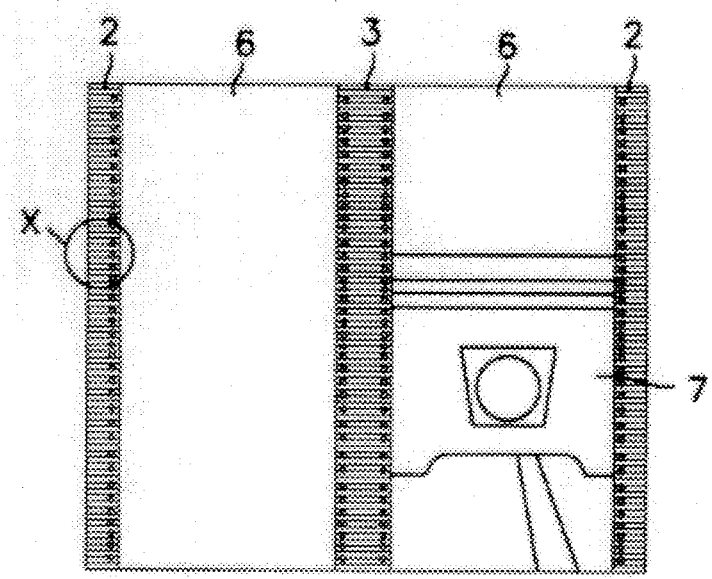
FIG. 1 is fragmentary schematic longitudinal sectional view showing a cylinder block and crankcase assembly.
Figure 2:
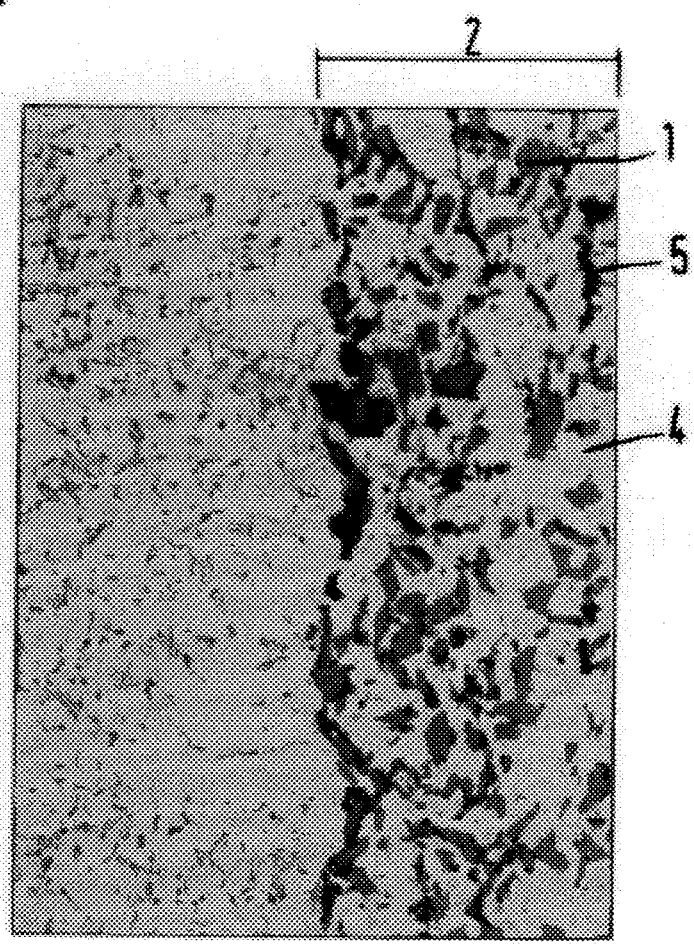
FIG. 2 shows the portion designated "X" in FIG. 1 magnified about 100 times.

During the casting of the cylinder block and crankcase assembly 3, a remelted alloy 4 of the type AlSi9Cu is infiltrated under a relatively high casting pressure of 100 bars into the cavities of a hollow-cylindrical shaped body 2, which consists of silicon grains 1 having an average particle size of 45 to 55 micrometers. The silicon grains 1 are bonded to each other by an inorganic binder 5 of the silicate type. Because the silicon has a high solubility in the aluminum alloy, it is reliably bonded to the matrix 4 of the aluminum alloy. The cavities of the shaped body 2 occupy a volume of about 75% and are entirely filled with infiltrated aluminum alloy. The proportion of silicon in the sliding surface 6 of the cylinder amounts to 25%. After the casting operation the cylinder bore is machined by rough and finish boring and is subsequently honed. The piston 7 consists of an aluminum alloy and its skirt need not be provided with a special coating.

Figure 3:
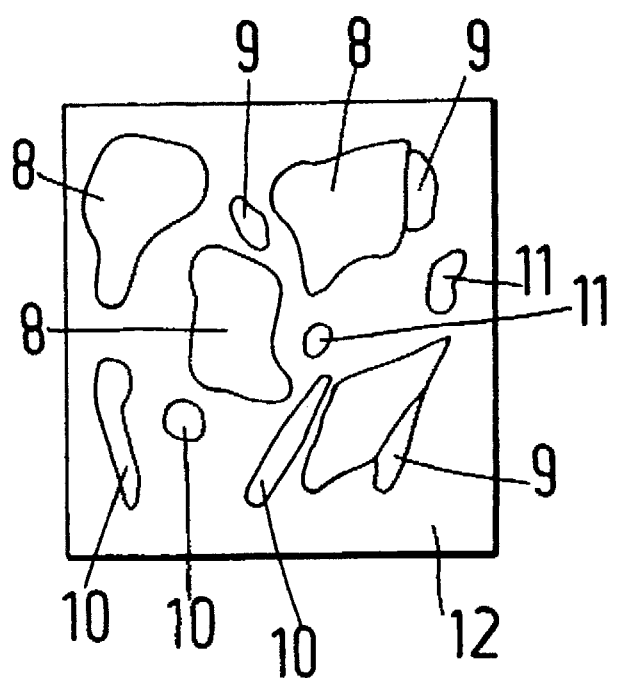
FIG. 3 is schematic representation showing a shaped body that is composed of a plurality of components differing in hardness.

FIG. 3 is a schematic representation of a shaped body, which is composed of component materials consisting of silicon 8, lead 9, graphite 10, and silicon carbide 11, and the cavities of which are entirely filled with infiltrated aluminum alloy 12.

It will be understood that the specification and examples are illustrative but not limitative of the present invention and that other embodiments within the spirit and scope of the invention will suggest themselves to those skilled in the art.

We claim:

1. In a cast sliding surface bearing for guiding and supporting rotating or radically or axially reciprocating machine members (7), which bearing comprises a light alloy matrix (4) which contains a cast-in shaped body (2), which constitutes portions of the sliding surface (6) and is made of a hard material and has open cavities and which contain infiltrated matrix material, the improvement wherein the open cavities of the shaped body (2), which is substantially free of closed cavities, are filled with matrix metal (4) having a substantially low porosity, each of the hard portions of the shaped body which lie in the sliding surface has a size, measured in an axis, of about $\leq 0.1$ mm, and the distance between the hard portions of the shaped body, measured in an axis, is about $\leq 2$ mm.

2. A sliding surface bearing according to claim 1, wherein the hardness of the hard material (1) is at least about 3 times the hardness of the light alloy matrix (4) and as the hardness of the hard material increases the size of those portions of the shaped body which lie in the sliding surface (6) decreases.

3. A sliding surface bearing according to claim 1, wherein the proportion of the hard material (1) amounts to 5 to 50% by volume.

4. A sliding surface bearing according to claim 1, wherein the hard material (1) comprises pure material, substantially of metals and metal alloys or intermetallic phases.

5. A sliding surface bearing according to claim 1, wherein the hard material (1) comprises at least one metal carbide, nitride, boride, aluminide or silicide.

6. A sliding surface bearing according to claim 1, wherein the hard material (1) comprises at least one of boron carbide, silicon carbide, alumina and boron nitride.

7. A sliding surface bearing according to claim 1, wherein the hard material (1) comprises at least one metal oxide.

8. A sliding surface bearing according to claim 1, wherein the shaped body (2) and the light alloy matrix (4) are bonded to one another.

9. A sliding surface bearing according to claim 1, wherein the shaped body (2) and the light alloy matrix (4) are bonded to one another by a primer layer.

10. A sliding surface bearing according to claim 1, wherein at least one soft material is bedded in the shaped body (2) made of hard materials (1).

11. A sliding surface bearing according to claim 1, wherein the particles of the shaped body (2) are bonded to one another by an inorganic binder.

12. A sliding surface bearing according to claim 1, wherein the particles of the shaped body (2) are joined by sintering, flame spraying or plasma spraying or by partly solidified molten droplets.

13. A sliding surface bearing according to claim 1, wherein the particles of the shaped body (2) are composed of silicon grains (1) joined by silicon nitride formed at the grain boundaries.

14. A sliding surface bearing according to claim 1, wherein the particles of the shaped body (2) comprise silicides which are joined to one another by chemically precipitated silicon.

15. A sliding surface bearing according to claim 1, wherein the particles of the shaped bodies (2) comprise at least one of spheres, grains, straight or curved platelets and straight or curved rods.

16. A sliding surface bearing according to claim 1, wherein the shaped body (2) is mounted on a thin-walled carrier, which is made of sheet metal, a sieve, a woven mat or a nonwoven mat and is a hollow cylinder or a curved sheet.

17. A sliding surface bearing according to claim 1, wherein the shaped body (2) comprises bulk material.

18. A sliding surface bearing according to claim 2, wherein the proportion of the hard material (1) amounts to 5 to 50% by volume, the hard material comprises at least one selected from the group consisting of silicon, titanium, vanadium, chromium, manganese, iron, cobalt, nickel, zirconium, molybdenum, $Al_3Zr$, $Al_3Cu$, $Al_3Ti$, $Al_xFe_yMn_z$, $Al_xCu_yNi_z$, $Mg_2Si$, tungsten carbide, titanium carbide, tantalum carbide, boron carbide, silicon carbide, alumina, boron nitride, beryllium oxide, magnesia, calcium oxide, sirconium oxide, titanium oxide, chromium oxide, mullite, corderite and spinal; the shaped body (2) and the light alloy matrix (4) are bonded to one another by a primer layer; at least one graphite, lead and molybdenum sulfide is embedded in the hard body; the particles of the shaped body (2) are bonded to one another by an oxide or silitate binder or by sintering, flame spraying or plasma spraying or by partly solidified molten droplets; the particles of the shaped bodies (2) comprise at least one of spheres, grains, straight or curved platelets and straight or curved rods; and the shaped body (2) is mounted on a thin-walled carrier, which is made of sheet metal, a sieve, a woven mat or a nonwoven mat and is a hollow cylinder or a curved sheet.

19. A sliding surface bearing according to claim 18, having apertures which are closed by a plastic film.

* * * * *